US009835288B1

(12) United States Patent
Matthews

(10) Patent No.: US 9,835,288 B1
(45) Date of Patent: Dec. 5, 2017

(54) MONITOR SUPPORT DEVICE

(71) Applicant: Patrick T. Matthews, Ramsey, MN (US)

(72) Inventor: Patrick T. Matthews, Ramsey, MN (US)

( * ) Notice: Subject to any disclaimer, the term of this patent is extended or adjusted under 35 U.S.C. 154(b) by 0 days.

(21) Appl. No.: 15/195,205

(22) Filed: Jun. 28, 2016

(51) Int. Cl.
*A47B 97/00* (2006.01)
*F16M 13/02* (2006.01)
*F16M 11/24* (2006.01)
*F16M 11/04* (2006.01)

(52) U.S. Cl.
CPC .............. *F16M 13/02* (2013.01); *A47B 97/00* (2013.01); *F16M 11/041* (2013.01); *F16M 11/242* (2013.01); *A47B 2097/005* (2013.01)

(58) Field of Classification Search
CPC ............. F16M 11/041; F16M 11/2014; F16M 11/105; F16M 11/06; F16M 11/242; A47F 5/0846
USPC ...... 248/121, 221.11, 222.51, 222.52, 274.1, 248/917, 922
See application file for complete search history.

(56) References Cited

U.S. PATENT DOCUMENTS

| | | | | |
|---|---|---|---|---|
| 6,059,156 A * | 5/2000 | Lehtinen | ................... | A45F 5/02 224/197 |
| 6,863,252 B2 * | 3/2005 | Bosson | ................ | F16M 11/041 248/131 |
| 7,232,098 B2 * | 6/2007 | Rawlings | ............. | F16M 11/041 248/121 |

* cited by examiner

Primary Examiner — Todd M Epps
(74) Attorney, Agent, or Firm — Dave Alan Lingbeck

(57) ABSTRACT

A monitor support device for mounting flat screen monitors upon stands. The monitor support device includes a support member adapted to be mounted to a monitor stand; and a bracket assembly removably mounted to the support member and adapted to be coupled to a monitor.

12 Claims, 4 Drawing Sheets

MONITOR SUPPORT DEVICE

BACKGROUND OF THE INVENTION

Field of the Invention

The present invention relates to supports and more particularly pertains to a new monitor support device for mounting flat screen monitors upon stands.

Description of the Prior Art

The use of supports is known in the prior art. More specifically, supports heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a pivot mount assembly and a slide mount assembly to allow the frame to longitudinally translate to permit fore-and-aft positioning of the touch screen monitor. Another prior art includes a rotatable hub which is connected to the back of the flat panel monitor. The rotatable hub is mounted for rotational movement which allows rotation of the monitor from a vertical format viewing position to a horizontal format viewing position. Further, another prior art includes a height adjustment which can be adjusted from sub-surface to super-surface upon installation and fixed in place with security screws. The user of the display would be able to adjust the angle of the display. In addition, another prior art includes a platform; a turntable coupled to the platform for rotation of the platform about a vertical axis; a support that includes a column, an extension and an arm joint disposed on the extension; a monitor mount that includes an arm joint. Yet another prior art includes a monitor that includes a computing device and a touch screen apparatus and method for mounting a plurality of display monitors. The apparatus can be easily moved toward and away from the user such that all the monitors mounted on the apparatus move in unison in the direction indicated by the user. While these devices fulfill their respective, particular objectives and requirements, the aforementioned patents do not disclose a new monitor support device.

SUMMARY OF THE INVENTION

The general purpose of the present invention, which will be described subsequently in greater detail, is to provide a new monitor support device which has many of the advantages of the supports mentioned heretofore and many novel features that result in a new monitor support device which is not anticipated, rendered obvious, suggested, or even implied by any of the prior art supports, either alone or in any combination thereof. The present invention includes a support member adapted to be mounted to a monitor stand; and a bracket assembly removably mounted to the support member and adapted to be coupled to a monitor. None of the prior art includes the combination of the elements of the present invention.

There has thus been outlined, rather broadly, the more important features of the monitor support device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new monitor support device which has many of the advantages of the supports mentioned heretofore and many novel features that result in a new monitor support device which is not anticipated, rendered obvious, suggested, or even implied by any of the prior art supports, either alone or in any combination thereof.

Still another object of the present invention is to provide a new monitor support device for mounting flat screen monitors upon stands.

Still yet another object of the present invention is to provide a new monitor support device that is easy and convenient to dismount and remove.

Even still another object of the present invention is to provide a new monitor support device that can be rotated and positioned as desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following, detailed description thereof. Such description makes reference to the annexed drawings wherein.

DETAILED DESCRIPTION OF THE INVENTION

Figure 1:
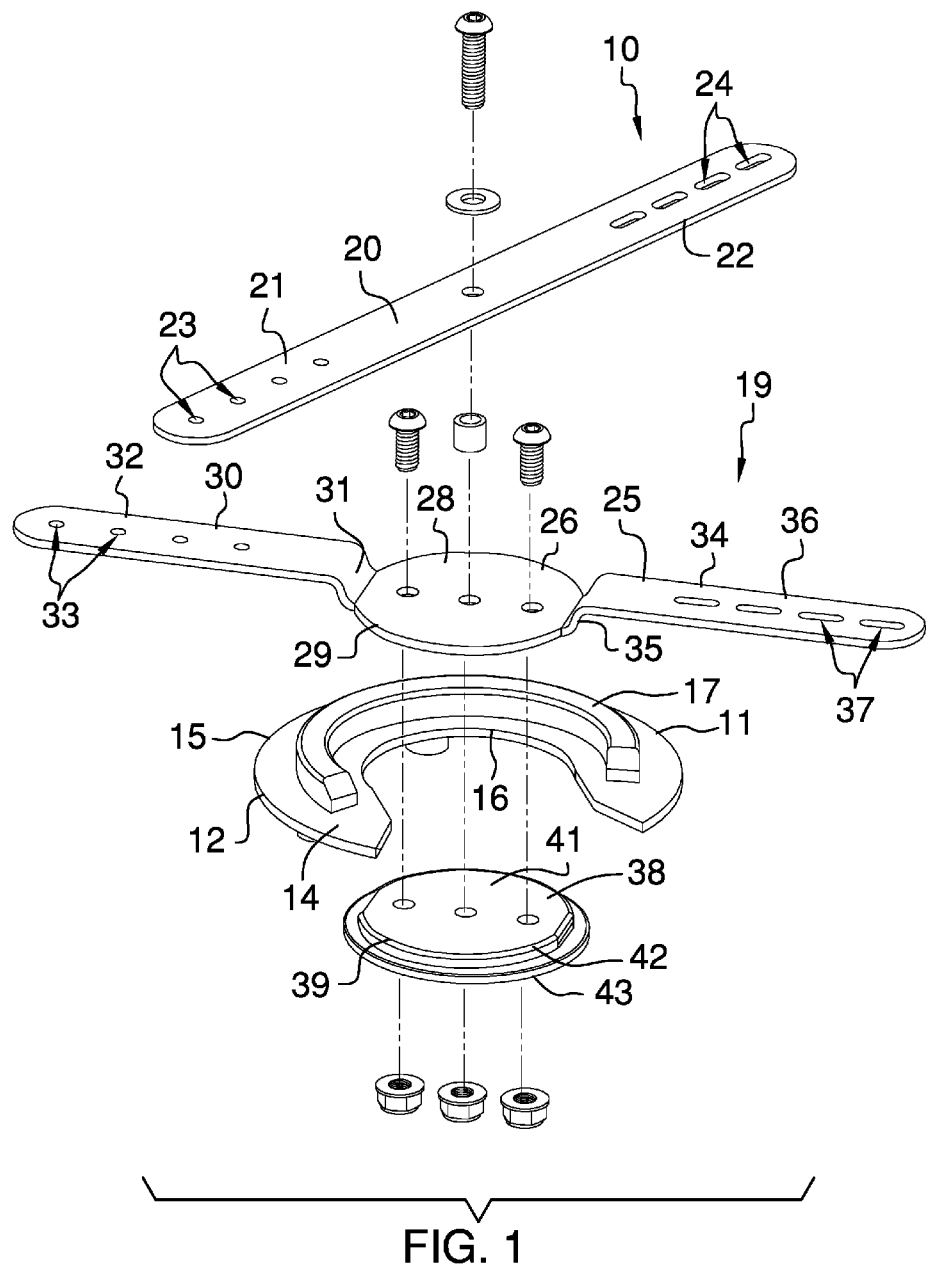
FIG. 1 is an exploded rear perspective view of a new monitor support device according to the present invention.
Figure 2:
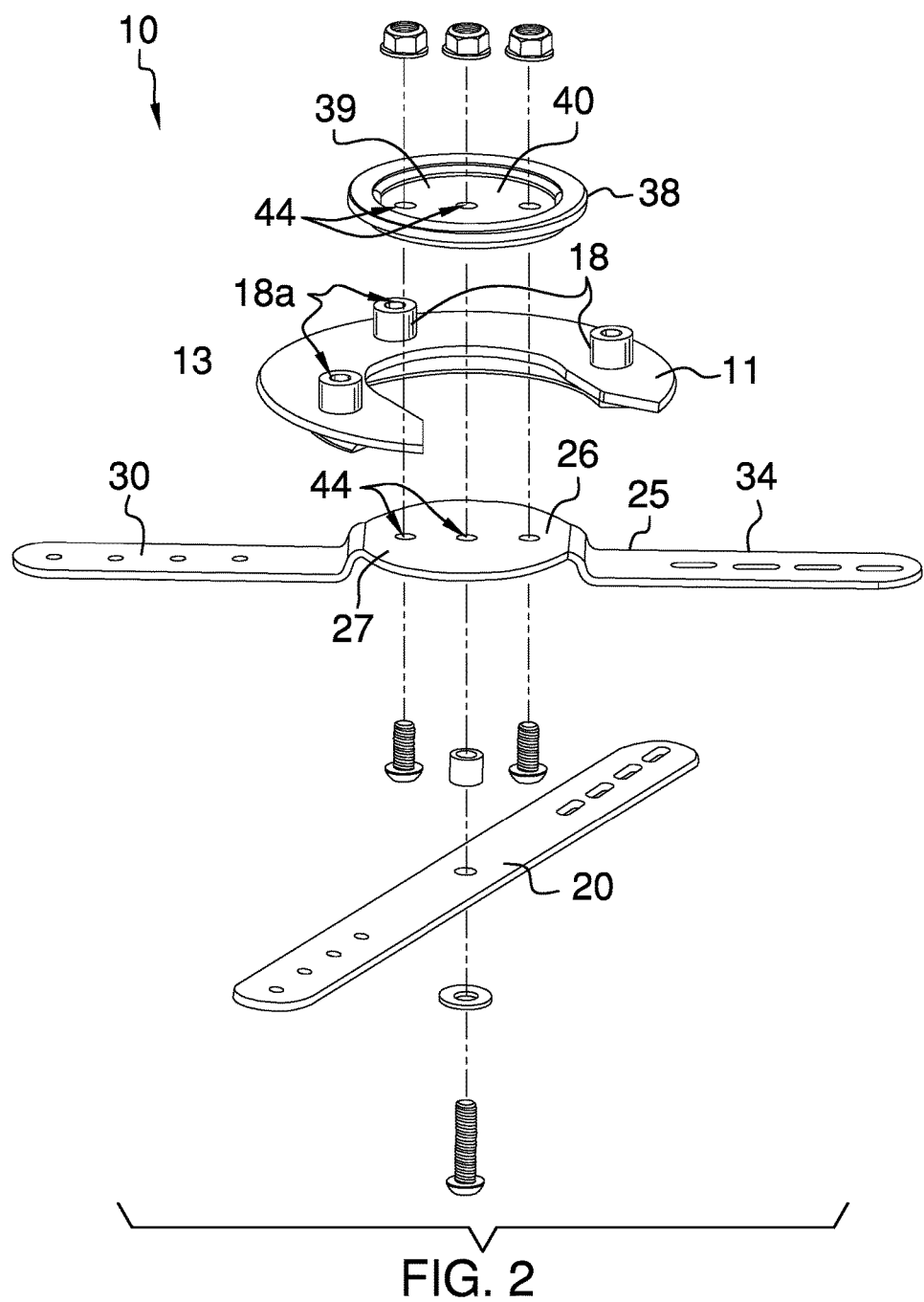
FIG. 2 is an exploded front perspective view of the present invention.
Figure 3:
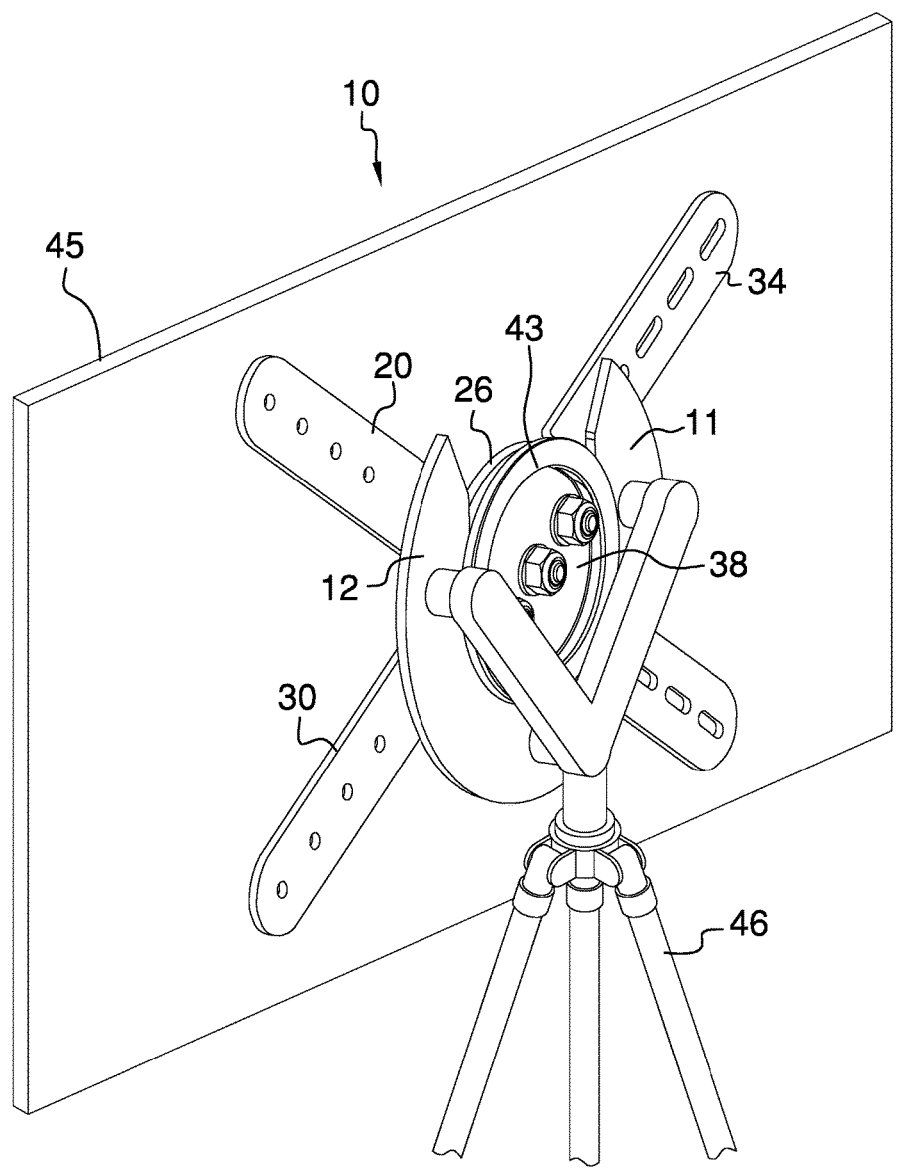
FIG. 3 is a front perspective view of the present invention.
Figure 4:
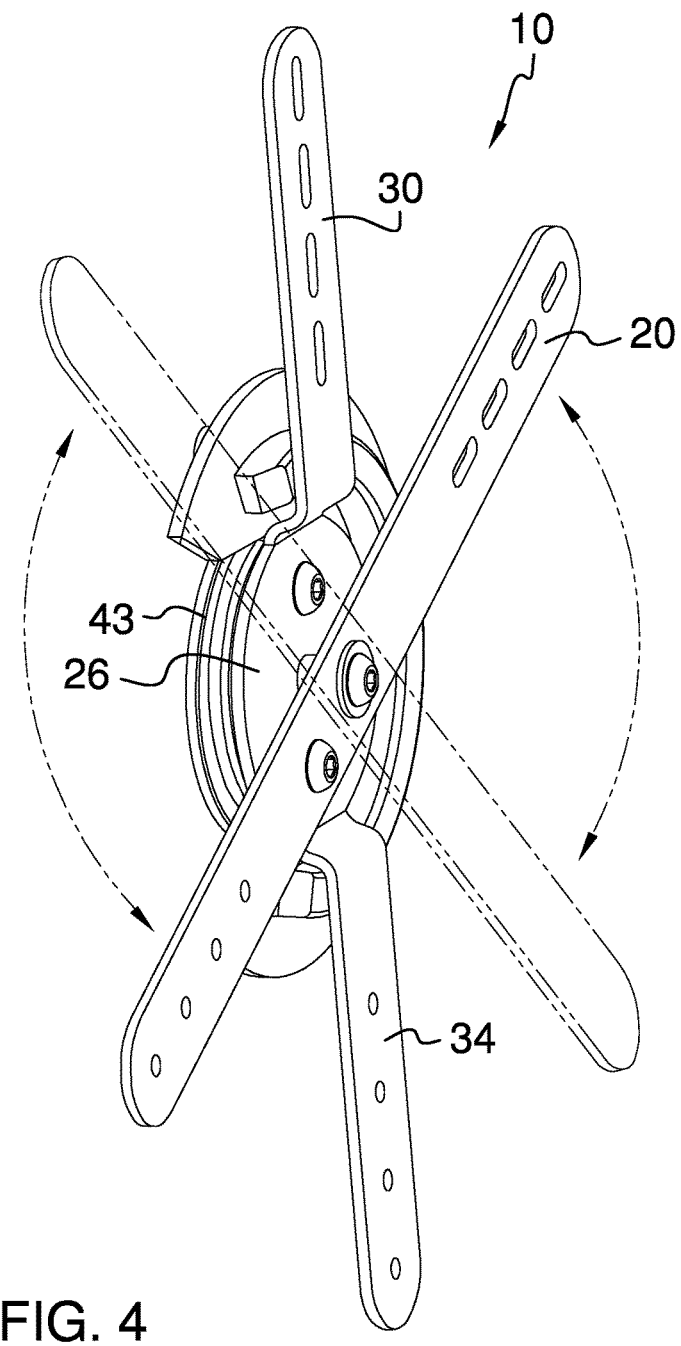
FIG. 4 is a rear perspective view of the present invention.

With reference now to the drawings, and in particular to FIGS. 1 through 4 thereof, a new monitor support device embodying the principles and concepts of the present invention and generally designated by the reference numeral 10 will be described.

As best illustrated in FIGS. 1 through 4, the monitor support device 10 may generally comprise a rigid support member 11 adapted to be mounted to a monitor stand 46, and a rigid bracket assembly 19 removably mounted upon the support member 11 and adapted to be coupled to a monitor 45. The support member 11 may include an arc-shaped planar member 12 having first and second sides 13, 14, a curved outer edge 15 and a curved inner edge 16 forming an arc-shaped slot 47. The support member 11 may also include an arcuate rib 17 conventionally and integrally attached to and protruding from the second side 14 of the planar member 12. The arcuate rib 17 may be concentric with the outer edge 15 and the inner edge 16 of the planar member 12 and is spaced from the inner edge 16 of the planar member 12. The planar member 12 may have bosses 18 spaced apart and conventionally disposed upon the first side 13 with each boss 18 having a bore 18a extending therein for coupling to the monitor stand 46.

As shown in FIGS. 1 through 4, the bracket assembly 19 may include a first elongate bracket 20 having, opposed first and second end portions 21, 22 with holes 23 spaced apart and disposed through the first end portion 21 and with elongate openings 24 spaced apart and disposed through the second end portion for receiving conventional fasteners to couple the first elongate bracket 20 to the monitor 45. The bracket assembly 19 may also include a second elongate bracket 25 having a disc-shaped hub 26 having planar sides 27, 28 and removably and conventionally coupled to the first elongate bracket 20 and removably disposed upon the support member 11 and also having first and second elongate extensions 30, 34 diametrically opposed to one another and conventionally and integrally attached to and extending outwardly from an outer edge 29 the disc-shaped hub 26. Each of the first and second elongate extensions 30, 34 may have a proximate end portion 31, 35 which extends outwardly and is angled relative to one of the planar sides 28 of the disc-shaped hub 26, and may also have a main portion 32, 36 which may be angled relative to the proximate end portion 31, 35 and may be disposed parallel to the planar sides 27, 28 of the disc-shaped hub 26. The first elongate extension 30 may have holes 33 spaced along a length of the main portion 32 of the first elongate extension 30 and the second elongate extension 34 may have elongate openings 37 spaced along a length of the main portion 36 of the second elongate extension 34 for adjustably and removably receiving conventional fasteners to couple the second elongate bracket 25 to the monitor 45. The bracket assembly 19 may further include a retainer 38 conventionally fastenable to the hub 26 of the second elongate bracket 25 and rotatably and movably mounted upon the support member 11 for mounting the monitor 45 upon the monitor stand 46. The retainer 38 may include a disk 39 having an outer edge 42, a first side 40 and a second side 41 with holes 44 disposed therethrough for receiving fasteners to fasten the retainer 38 to the hub 26. The outer edge 42 of the disk 39 may be removably disposed in the arc-shaped slot 47 of the arc-shaped planar member 12 and is removably supported upon the curved inner edge 16 of the support member 11. The retainer 38 may also include an annular flange 43 conventionally attached and disposed parallel to the first side 40 of the disk 39 and extending outwardly beyond the outer edge 42 of the disk 39. The annular flange 43 may be engagable with the first side 13 of the arc-shaped planar member 12 to removably and securely retain the bracket assembly 19 and the monitor 45 upon the support member 11.

In use, the first and second elongate brackets 20, 25 may be adjustably fastened with conventional fasteners to a back of a flat screen monitor 45, and the support member 11 may be conventionally fastened with conventional fasteners to the monitor stand 46. The retainer 38 may be conventionally fastened to the disc-shaped hub 26 and rotatably disposed in the arc-shaped slot 47 with the annular flange 43 engagable with the first side of the planar member 12 and with the disk 39 resting upon the curved inner edge 16 of the planar member 12 and the outer edge 29 of the disc-shaped hub 26 resting upon the arcuate rib 17 with the bracket assembly 19 being rotatably adjustable relative to the support member 11 and to the monitor stand 46.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the monitor support device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A monitor support device comprising:
    a rigid support member adapted to be mounted to a monitor stand, wherein the support member includes an arc-shaped planar member having first and second sides, a curved outer edge and a curved inner edge forming an arc-shaped slot, wherein the support member also includes an arcuate rib attached to and protruding from the second side of the planar member; and
    a rigid bracket assembly removably mounted to the support member and adapted to be coupled to a monitor.

2. The monitor support device as described in claim 1, wherein the arcuate rib is concentric with the outer edge and the inner edge of the planar member and is spaced from the inner edge of the planar member.

3. The monitor support device as described in claim 2, wherein the planar member has bosses spaced apart and disposed upon the first side with each boss having a bore extending therein for coupling to the monitor stand.

4. The monitor support device as described in claim 2, wherein the bracket assembly includes a first elongate bracket having opposed first and second end portions with holes spaced apart and disposed through the first end portion and with elongate openings spaced apart and disposed through the second end portion for coupling to the monitor.

5. The monitor support device as described in claim 4, wherein the bracket assembly also includes a second elongate bracket having a disc-shaped hub having planar sides and removably coupled to the first elongate bracket and removably disposed upon the support member, and also having first and second elongate extensions diametrically opposed to one another and extending outwardly from an outer edge the disc-shaped hub.

6. The monitor support device as described in claim 5, wherein each of the first and second elongate extensions has a proximate end portion which extends outwardly and is angled relative to one of the planar sides of the disc-shaped hub, and also has a main portion which is angled relative to the proximate end portion and is disposed parallel to the planar sides of the disc-shaped hub.

7. The monitor support device as described in claim 6, wherein the first elongate extension has holes spaced along a length of the main portion of the first elongate extension and the second elongate extension has elongate openings spaced along a length of the main portion of the second elongate extension for adjustably and removably coupling to the monitor.

8. The monitor support device as described in claim 5, wherein the bracket assembly further includes a retainer fastenable to the hub of the second elongate bracket and rotatably mounted upon the support member for mounting the monitor upon the monitor stand.

9. The monitor support device as described in claim 8, wherein the retainer includes a disk having an outer edge, a first side and a second side with holes disposed therethrough for receiving fasteners to fasten to the hub.

10. The monitor support device as described in claim 9, wherein the outer edge of the disk is removably disposed in the arc-shaped slot of the arc-shaped planar member and is removably supported upon the curved inner edge.

11. The monitor support device as described in claim 9, wherein the retainer also includes an annular flange attached and disposed parallel to the first side of the disk and extending outwardly beyond the outer edge of the disk.

12. The monitor support device as described in claim 11, wherein the annular flange is engagable with the first side of the arc-shaped planar member to removably and securely retain the bracket assembly and the monitor upon the support member.

* * * * *